US012782050B2

(12) United States Patent
Scheurich

(10) Patent No.: US 12,782,050 B2
(45) Date of Patent: Nov. 3, 2026

(54) SUCTION DEVICE FOR DRYING AT LEAST ONE PLASTIC STRAND

(71) Applicant: MAAG GERMANY GmbH, Grossostheim (DE)

(72) Inventor: Jochen Scheurich, Niedernberg (DE)

(73) Assignee: MAAG GERMANY GmbH, Grossostheim (DE)

( * ) Notice: Subject to any disclaimer, the term of this patent is extended or adjusted under 35 U.S.C. 154(b) by 567 days.

(21) Appl. No.: 18/233,858

(22) Filed: Aug. 14, 2023

(65) Prior Publication Data

US 2024/0060718 A1 Feb. 22, 2024

(30) Foreign Application Priority Data

Aug. 19, 2022 (DE) ..................... 10 2022 121 045.6

(51) Int. Cl.
*D06F 58/22* (2006.01)
*B65G 15/00* (2006.01)
(Continued)

(52) U.S. Cl.
CPC .............. *F26B 5/12* (2013.01); *F26B 13/001* (2013.01); *F26B 25/10* (2013.01)

(58) Field of Classification Search
CPC .......... F26B 5/12; F26B 13/001; B65G 15/00; B65G 15/04; B65G 15/10
(Continued)

(56) References Cited

U.S. PATENT DOCUMENTS 3,943,640 A 3/1976 Paul et al.
4,632,752 A 12/1986 Hunke
(Continued)

FOREIGN PATENT DOCUMENTS

CH 298463 A 7/1954
CN 107364034 A 11/2017
(Continued)

OTHER PUBLICATIONS

European Extended Search Report mailed Jan. 9, 2024 in counterpart European application EP 23 19 1774, 11 pages in German.
(Continued)

*Primary Examiner* — Deming Wan
(74) *Attorney, Agent, or Firm* — Juan Carlos A. Marquez; Marquez IP Law Office, PLLC

(57) ABSTRACT

A suction device for drying at least one plastic strand, incorporates a suction housing having a top side, a bottom side and several lateral surfaces, the top side having an inlet opening and one of the other surfaces having an outlet opening for the flow of a drying medium therethrough, and a screening element which has through apertures a base area with a maximum length and a maximum width. Each through aperture has an aperture cross-sectional area, and the sum of the aperture cross-sectional areas of all through apertures together forms a total aperture cross-sectional area. The screening element is on the top side and has its drying area above the inlet opening of the suction housing. The at least one plastic strand is moved in a process direction on the screening element, wherein the process direction is in a longitudinal direction of the screening element. The length of the drying area is at least 150 mm, and a ratio of the total aperture cross-sectional area of the through apertures to the base area of the drying area is between 30% and 45%, in particular 35% and 40%.

22 Claims, 6 Drawing Sheets

(51) Int. Cl.

| | |
|---|---|
| ***B65G 15/04*** | (2006.01) |
| ***B65G 15/10*** | (2006.01) |
| ***D06F 58/20*** | (2006.01) |
| ***D06F 58/36*** | (2020.01) |
| ***D06F 58/38*** | (2020.01) |
| ***D06F 58/44*** | (2020.01) |
| ***F26B 5/12*** | (2006.01) |
| ***F26B 13/00*** | (2006.01) |
| ***F26B 25/10*** | (2006.01) |

(58) Field of Classification Search

USPC ............. 34/384, 65, 216, 207, 419, 92, 242; 425/85

See application file for complete search history.

(56) References Cited

U.S. PATENT DOCUMENTS

| | | | | |
|---|---|---|---|---|
| 5,154,010 A * | 10/1992 | Klemm | F26B 3/00 34/68 |
| 5,628,947 A | 5/1997 | Keilert | |
| 5,787,604 A | 8/1998 | Kreuz et al. | |

FOREIGN PATENT DOCUMENTS

| | | | |
|---|---|---|---|
| EP | 1106319 | B1 | 2/2003 |
| EP | 1367349 | B1 | 12/2006 |
| GB | 2305887 | A | 4/1997 |
| JP | H09141653 | A | 6/1997 |
| JP | 2002265027 | A | 9/2002 |
| WO | 1992003270 | A | 3/1992 |

OTHER PUBLICATIONS

German Examination Report mailed Nov. 16, 2023 in counterpart German application E10 2022 121 045.6, 4 pages in German.

* cited by examiner

SUCTION DEVICE FOR DRYING AT LEAST ONE PLASTIC STRAND

This application is claims priority to German Patent Application 20 2022 121045,6 filed Aug. 19, 2021. The disclosure of the above-referenced application is incorporated herein by reference in its entirety.

The invention relates to a suction device for drying at least one plastic strand, of the type specified in the preamble of claim 1.

In plastic granulate production, following polymerization, the molten plastic is forced through nozzles in the extruder. Plastic strands come out of the nozzles and are then cooled in water. Before granulation of these plastic strands, any water remaining on their surface needs to be removed by means of a drying process. Two different types of drying processes, i.e. for the removal of water on the strand surface, are basically known. First of all, there is a prior art device which uses a blowing process to dry the plastic strands and thus remove the water from their surfaces. Secondly, a suction device is known which dries the plastic strands by means of a suction process.

The present invention relates to a suction device of this latter type which has been known for quite some time. In this device, the plastic strands are guided over a planar screening element. This kind of screening element, also known as a slot screen, for example consists of a large number of bars of a width of 2.2 mm each, each of which is welded laterally onto a common supporting bar. These screening elements have a gap of 1.2 mm between the bars. These gaps extend continuously over the entire width of each screening element. In this device, the effective drying area is the entire base area of the screening element. The drawback of these prior art screening elements is that they are very sensitive to mechanical impact and can thus be damaged easily during a cleaning step which needs to be performed regularly.

The prior art suction device further has a housing in the form of a suction box, with the screening element resting on the top side thereof. During operation, the plastic strands are passed over the screening element for drying. The screening element is connected to a suction channel located underneath it through which suction air flows. An extractor fan is used to draw in the suction air from the atmosphere, pass it over the plastic strands on the screening element, through the gaps in the screening element and convey it further. The extraction air flow is regularly fed to a water separator before the extraction air flow is discharged to the atmosphere.

The width of the screening elements varies from approx. 50 mm for laboratory use, to between 100 mm and 900 mm for series production. The length of the screening elements is almost always limited to 100 mm. These suction devices have been designed to ensure that the air flow over the plastic strands has a very high air velocity of up to 50 m/s in order to tear off the adhering water film and remove the water from the strand surface.

A drawback of this prior art suction device is that the plastic strands do not necessarily rest continuously on the screening element as they pass through the device. As a result, in those places where the plastic strands do not rest on the screening element, the velocity of the suction air flow acting on the plastic strand will be significantly lower, resulting in a poorer drying performance.

For this reason, a cover element has been provided in which the air enters at the front and rear, i.e. those places where the plastic strand is conveyed into and out of the device, more precisely where the plastic strand is conveyed onto the screening element and conveyed back down from the screening element. This creates a flow channel between the cover element and the screening element, and through the screening element. This measure has improved the drying performance, since even for plastic strands that do not rest on the screening element, this flow channel ensures exposure of these lifted plastic strands to a sufficiently high air velocity.

The screening elements usually have an aperture cross-section (open surface) which is between 30% and 45%, in particular between 35% and 40%, of the base area of the drying area of the screening element and which results in the required air velocity of up to 50 m/s, which is generated with the lowest possible and most energy-efficient air volume flow of the extractor fan. In the prior art screening elements, the base area of the drying area is identical, or substantially identical, to the base area.

A drawback of these known suction devices, however, is that their drying efficiency is not optimal either, because of the short dwell time of the plastic strands on the screening element, which dwell time does not suffice for completely removing any residual water on the strands.

It is the object of the invention, therefore, to further develop a suction device of the type specified in the preamble of claim 1 in such a way that the drying efficiency of the device is improved in a simple manner, whilst avoiding the above mentioned drawbacks.

This object is accomplished by the characterizing features of claim 1 in conjunction with the features of its preamble.

In a known manner, a suction device for drying at least one plastic strand has a suction housing. This housing consists of a top side, a bottom side and several lateral surfaces. The top side has an inlet opening, and an outlet opening is provided in one of the other surfaces for a drying medium to flow through. Furthermore, the suction device has a screening element with a drying area which has spatially distributed through apertures made therein. The drying area has a base area of a maximum length and a maximum width. Each through aperture has an aperture cross-sectional area. The sum of the aperture cross-sectional areas of all through apertures of the screening element forms a total aperture cross-sectional area. The screening element is located on the top side and its drying area is arranged above the inlet opening of the suction housing. The at least one plastic strand is moved in a process direction on the screening element. The process direction is oriented in a longitudinal direction of the screening element. According to the invention, the length of the drying area is at least 150 mm, and a ratio of the total aperture cross-sectional area of the through apertures to the base area of the drying area is in the range of between 30% and 45%, in particular 35% and 40%, of the drying area.

The length of the screening element and the ratio of the total aperture cross-sectional area of the through apertures to the base area of the drying area allow higher flow velocities to be achieved over the entire length of the drying area, with a simultaneously longer dwell time in the area of the plastic strand. This thus improves the drying performance for the plastic strand in a very energy-efficient way with the same suction flow and motor power of the extractor fan.

Preferably, the length of the drying area is at least 200 mm, and the ratio of the total aperture cross-sectional area of the through apertures to the base area of the drying area remains in the range of between 30% and 40%, in particular 35% and 40%. These parameters achieve the maximum flow rate with a significantly higher dwell time and thus the best drying performance for the at least one plastic strand.

In order not to waste installation space, the base area of the drying area of the screening element and a base area of the screening element are identical or almost identical.

In a further advantageous embodiment of the invention, the through apertures are slot-shaped. To be more precise, the through apertures are longer than they are wide. The slot-shaped design of the through apertures acts to greatly increase the flow velocity as a result of the so-called air knife effect.

Preferably, the length of the through apertures extends perpendicular to the process direction. Successively, as the one or plural plastic strand(s) are moved, they are subjected to multiple suction flows, thereby thoroughly removing water from their surfaces.

Preferably, the length of a through aperture is smaller than the width of the drying area. This allows the suction flow to be better adjusted in a distributed manner in the drying area.

Preferably, the through apertures have a width ranging from (and including) 2 mm up to (and including) 5 mm. This enables a higher core velocity of the air flow. In addition, due to the higher stability of the screening element, cleaning is easier than with a delicate prior-art slot screen.

In yet another advantageous embodiment of the invention, the through apertures are arranged next to one another perpendicular to the process direction.

Preferably, several rows of through apertures are provided, which are aligned parallel to each other in their longitudinal direction.

Parallel alignment of the through apertures enables the air flows through the through apertures to be guided in a specific and even manner, and allows a continuous flow of the suction air over the one or plural plastic strand(s).

Preferably, through apertures that are arranged next to one another are spaced from one another by between (and including) 8 mm and (and including) 30 mm.

Preferably, the rows of through apertures are spaced from one another by between (and including) 0 mm and (and including) 50 mm.

The specific spacing ensures even distribution in the drying area.

In a further advantageous embodiment of the invention, the screening element is formed from sheet metal. This results in a more stable and robust design, which will counteract damage during cleaning of the screening element.

To further increase the cleaning robustness of the screening element, the screening element is formed of a corrosion-resistant steel, in particular stainless steel or hardened steel. In addition, this also prevents corrosion from water acting on the screening element to the greatest possible extent.

Preferably, a laser is used for making the through apertures into the screening element. Use of a laser for this purpose will ensure precise formation of the through apertures. In addition, this process saves material.

Preferably, the screening element is made of several parts. The part elements are placed on top of each other in a sandwich-like manner. This makes it possible to adjust the surface area of the through apertures. In case of wear, the part elements can be easily exchanged among each other.

In order to create a flow channel between the screening element and the cover element, and thus increase the flow velocity, a cover element covering the entire drying area of the screening element is provided on the side of the screening element remote from the inlet opening, which cover element is arranged above the screening element and at a predetermined distance from the screening element.

Preferably, via the long sides of the cover element, the latter is connected to the suction housing in an airtight manner. This results in a flow channel being formed above the screening element that passes through the cover element, the long sides and the suction housing.

In yet another advantageous embodiment of the invention, a ventilation slot that extends perpendicular to the process direction is provided in the cover element centrally with respect to a length of the cover element, thus allowing a flow of the drying medium into the drying area from one end of the cover element between the cover element and the screening element, from the other end of the cover element between the cover element and the screening element, and via the ventilation slot. The central slot provided in the cover element generates a jet effect with the screening element and the flow channel, which further increases the velocity of the air flow on the plastic strand in a targeted manner. The jet effect caused by this so-called false air intake can be further enhanced by an integrated slot-shaped compressed air blow nozzle that acts across the width.

Preferably, the ventilation slot has an opening cross-section corresponding to 35% to 45% of the base area of the drying area of the screening element/cover element. In particular, the ventilation slot has a width of between 4 mm and 5 mm and a length of between 40 mm and 50 mm. This results in a velocity of between 45 m/s and 55 m/s for a given suction air volume flow.

Preferably, the base area of the top side of the suction housing is larger than the base area of the bottom side of the suction housing. Reducing the cross section of the suction housing in the bottom part of the suction housing results in an additional increase of the flow velocity as a result of the Venturi effect, which allows rapid removal of the humid exhaust air.

In order to generate an air movement, i.e. the suction flow, in the suction device, a suction unit is provided which conveys drying medium, in particular ambient air, through the inlet opening into the suction housing and through the outlet opening out of the suction housing.

In another advantageous embodiment of the invention, the suction unit is arranged outside the suction housing. This makes the suction unit easily accessible and reduces the installation space required for the suction housing.

Preferably, the suction housing is connected to a water separator downstream in the direction of flow. This allows the water in the suction housing to be disposed of outside the suction housing.

Additional advantages, features and possible applications of the present invention will be apparent from the description which follows, in which reference is made to the embodiments illustrated in the drawings.

Throughout the description, the claims and the drawings, those terms and associated reference signs are used as are stated in the list of reference signs below. In the drawings, FIG. 1 is a perspective view of the suction device according to the invention, taken at an angle from above;

Figure 1:
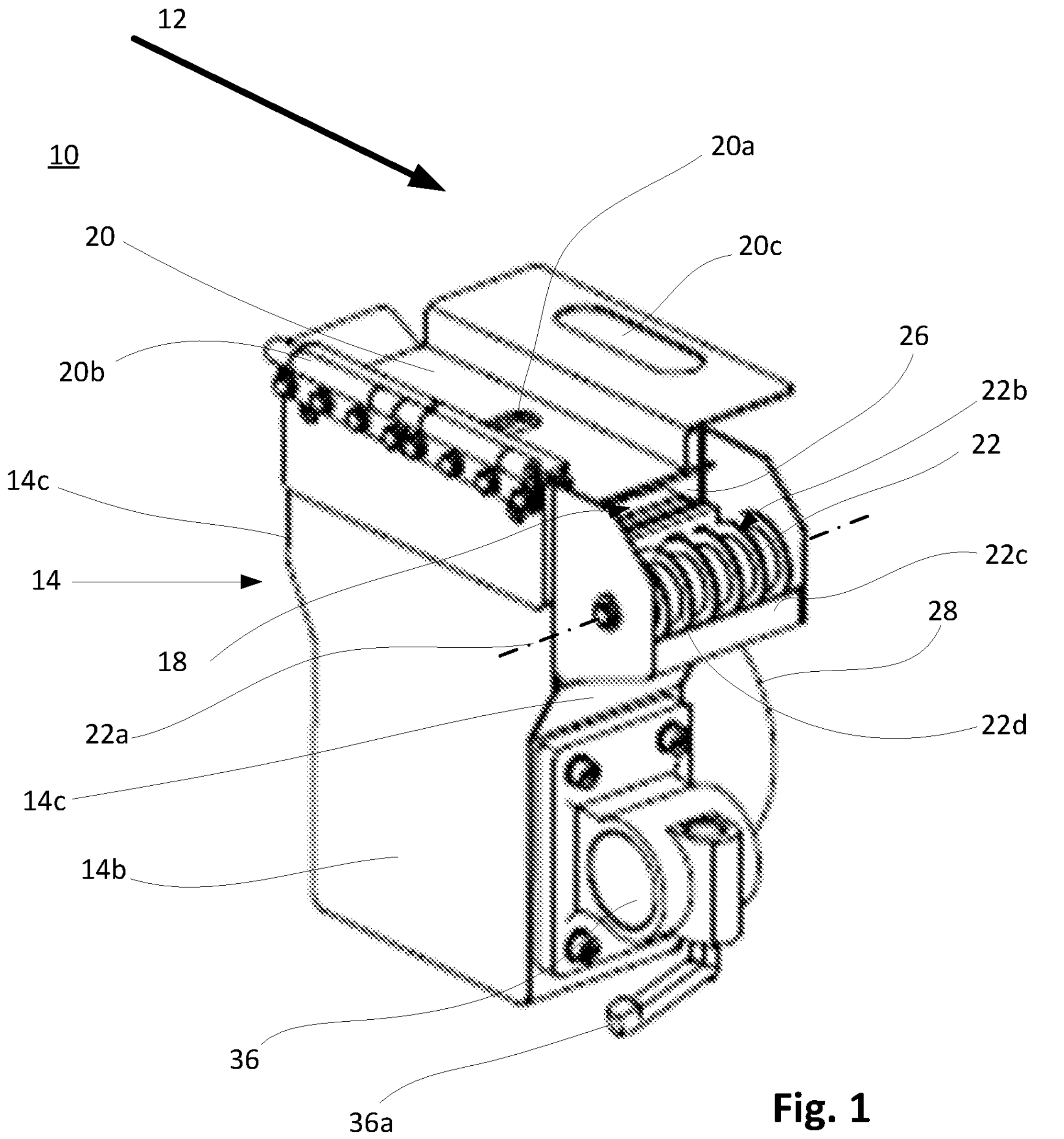

FIGS. 1 to 5 each are views of a suction device 10 having a suction body 14, a suction channel 28, a conveyor element 22 for conveying plastic strands, a cover 20 and a screening element 32.

FIG. 1 is a perspective view of the suction device 10, taken at an angle from above.

The suction body 14 has a front wall 14*a*, a rear wall 14*b* and two sidewalls 14*c*. The screening element 32 is arranged on the top side of the suction body 14 and is fluidically connected to the suction body 14 via an aperture in the top side. The suction body 14 has a larger cross-sectional area on its top side than on its bottom side.

The conveyor element 22 for conveying plastic strands is arranged on a sidewall 14*c* of the suction body 14. The conveyor element 22 rotates about an axis of rotation 22*a*. The conveyor element 22 is cylindrical in shape, with the cylindrical surface 22*d* extending along the axis of rotation 22*a* in each case. The conveyor element 22 includes a plurality of circumferential partitions 22*b* arranged side by side on the cylinder surface 22*d* spaced from the nearest partition. As a result, several plastic strands introduced into the conveyor element 22 will be separated from each other and moved separately in a process direction 12. The conveyor element 22 is surrounded in part by a housing 22*c*.

Below the conveyor element 22, a connection receptacle 36 is provided on the sidewall 14*c* adjacent to the conveyor element. More precisely, the connection receptacle 36 has a fastening element 36*a*. The fastening element 36*a* can be used to fix in place a connecting element inserted into the connecting receptacle 36. This allows the suction device 10 to be connected to a production line. The connection receptacle 36 is connected to the suction body 14 via several screw connections.

The cover 20 is pivotally connected to the rear wall 14*b* by a hinge 20*a*. The cover 20 has a cover opening 20*b*. The cover opening 20*b* is formed as a slot that is orthogonal to the process direction 12. More precisely, the cover opening 20*b* is arranged centrally along the process direction 12 with respect to the length and width of the screening element 32. In the area of the sidewalls 14*c*, the cover 20 is formed at an angle in such a way that it is inclined upwards away from the screening element 32.

The cover 20 forms a flow channel together with the channel sidewalls 26 and the screening element 32. The cover 20 covers at least the surface area of the screening element 32 and is arranged substantially parallel to the screening element 32. The flow channel has a first inlet opening 16 and a second inlet opening 18 for the plastic strands. Ambient air is sucked through both openings 16, 18 as well as through the cover opening 20*b* through the screening element 32 into the suction body 14.

In the area of the channel sidewalls 26, the cover 20 rests on the channel sidewalls 26 in an airtight manner.

The surface area of the screening element 32 corresponds to a drying area. The latter is at least 150 mm long, i.e. along the process direction 12.

The cover opening 20*b* has an opening cross-section corresponding to between 35% and 45% of the surface area of the drying area. The width of the cover opening 20*b* is between 4 mm and 5 mm and its length is between 40 mm and 50 mm. The width extends along the process direction 12 and the length is orthogonal to the process direction 12.

The suction body 14 has a cylindrical suction channel 28 on its front wall 14*a*. Pipes or tubes can be attached to the suction channel 28. The suction channel 28 is connected to a suction device not shown here, and ultimately to a water separator.

Figure 2:
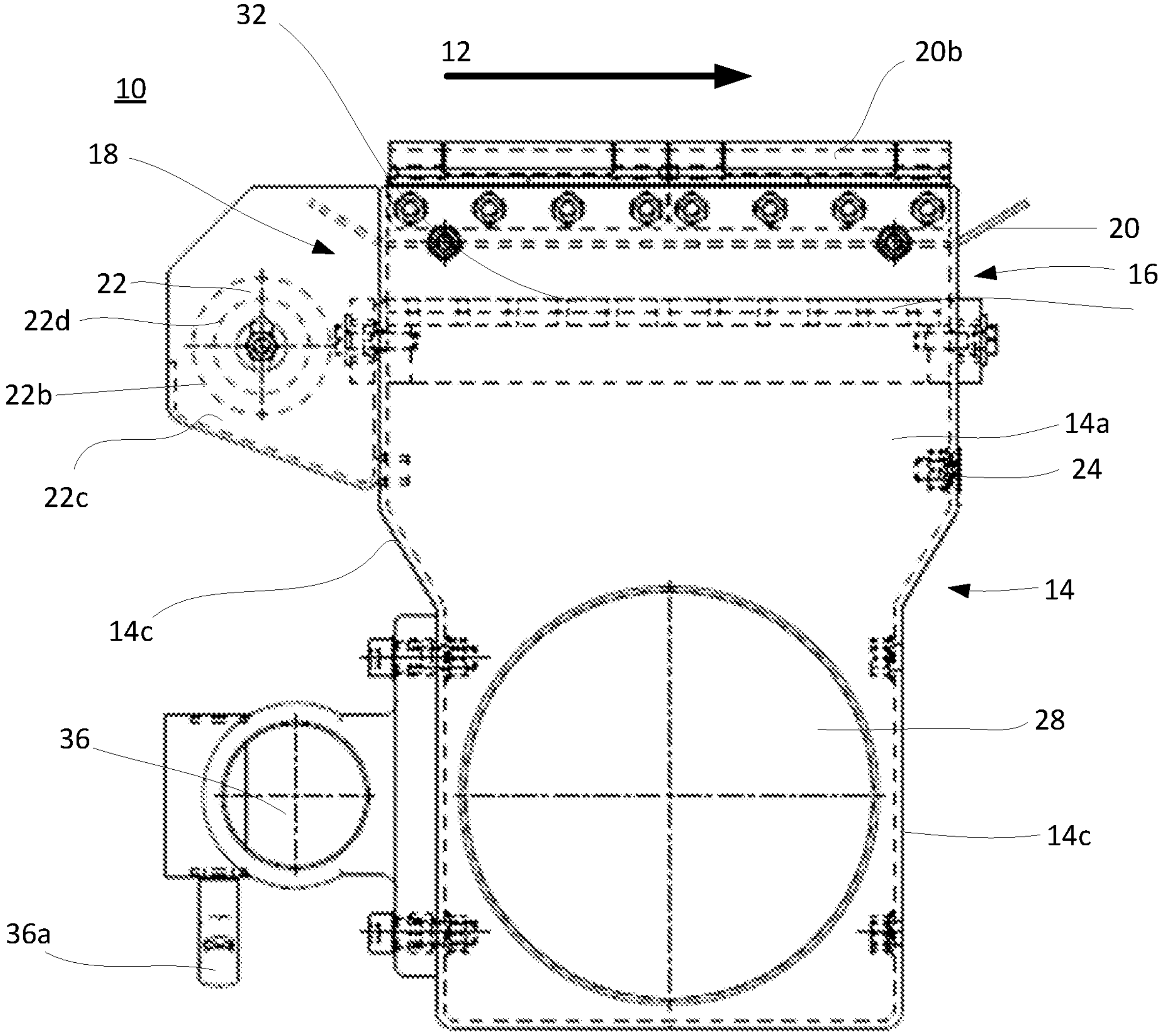
FIG. 2 is a side view of the suction device of FIG. 1, with lines indicating its internal structure.

FIG. 2 is a front view of the suction device 10. This drawing has lines in it that indicate a sectional view of the components behind it. The suction channel 28 is arranged in the bottom portion of the suction body 14. In the bottom portion of the suction body 14, the connection receptacle 36 with the fastening element 36*a* is also arranged on the sidewall 14*c*. Above the suction channel 28, the suction body 14 is wider than compared to its bottom portion. The walls 14*a*, 14*b*, 14*c* are each connected to one another in a secure and airtight manner by means of fasteners 24.

Figure 3:
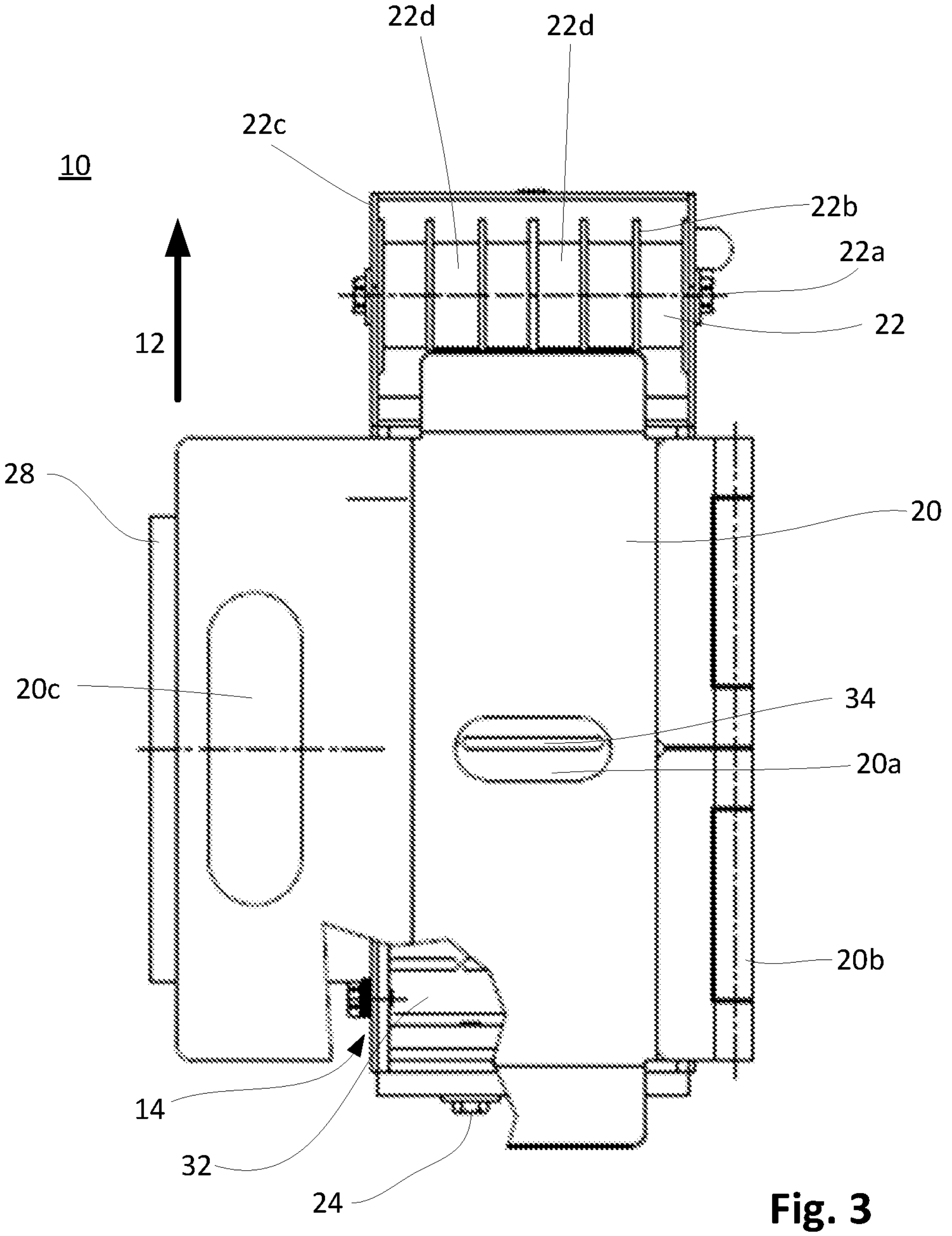
FIG. 3 is a top view of the suction device of FIG. 1.

FIG. 3 is a top view of the suction device 10. The cover 20 is shown cut open in some parts, see below left. As a result, the screening element 32 located under the cover 20 can be seen.

The screening element 32 has slots 34 made therein. The slots 34 are formed orthogonally to the process direction 12. The slots 34 are designed to be of different lengths. The width of the slots 34 is the same across the screening element 32. The width extends along the process direction 12 and the length is orthogonal to the process direction 12.

The width of the slots 34 is 4 mm.

The screening element 32 is preferably formed in several parts.

A ratio of the total aperture cross-sectional area of the slots 34 to the base area of the drying area, in this case the area of the screening element 32, is in the range of between 30% and 45%, in particular between 35% and 40%, of the drying area.

The cover 20 has a handle 20*c* in the area of the front wall element 20. The handle 20*c* can be used to pivot the cover 20 via the hinge 20*b* and open it so as to make the screening element 23 accessible from above. When the cover 20 is closed, it is connected to the front wall 14*a* and the rear wall 14*b* in an airtight manner.

Figure 4:
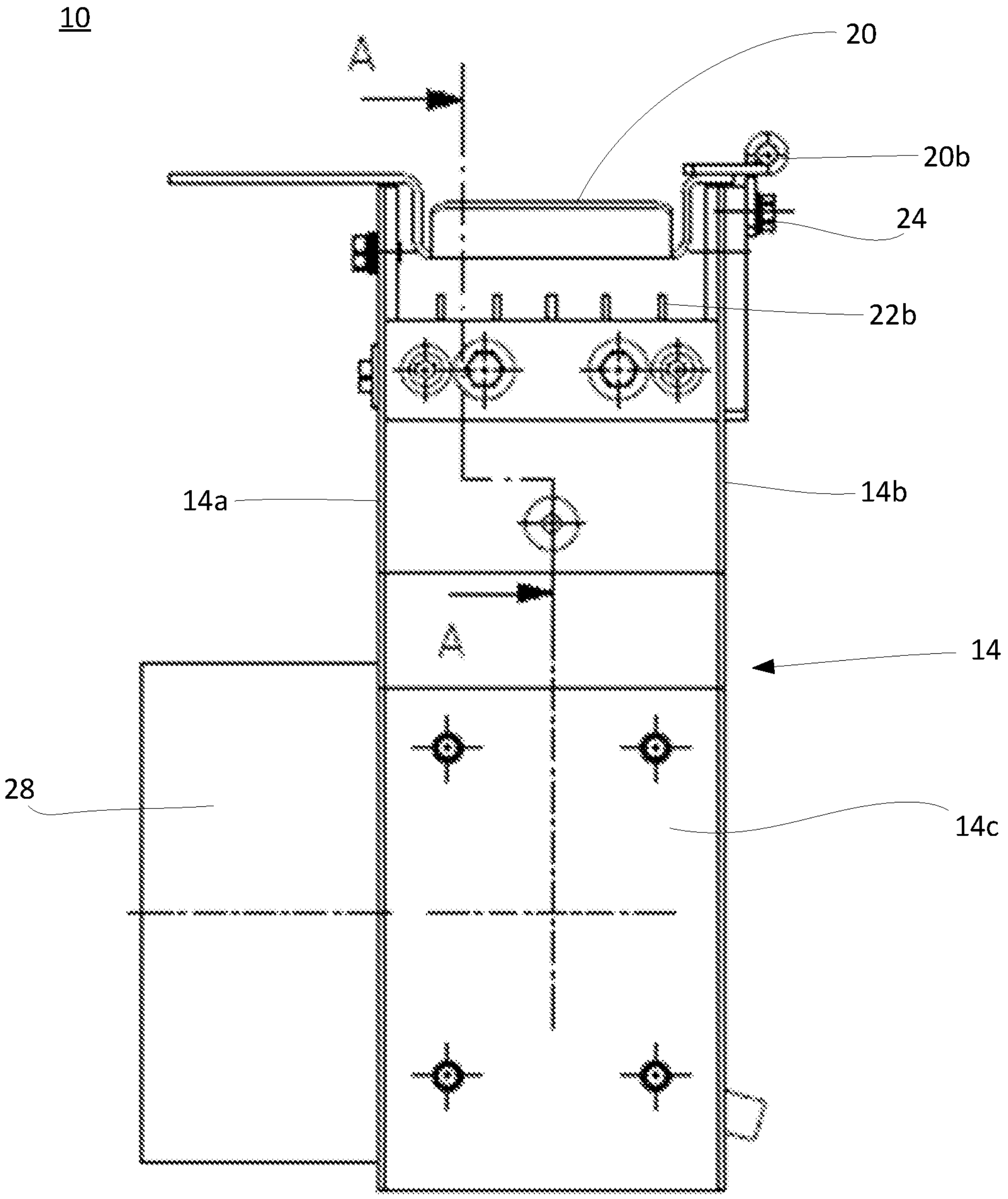
FIG. 4 is a front view of the suction device of FIG. 1 with section line A-A.

FIG. 4 is a side view of a sidewall 14*c* with section line A-A drawn in, and with the cover 20 being shown in its closed state.

Figure 5:
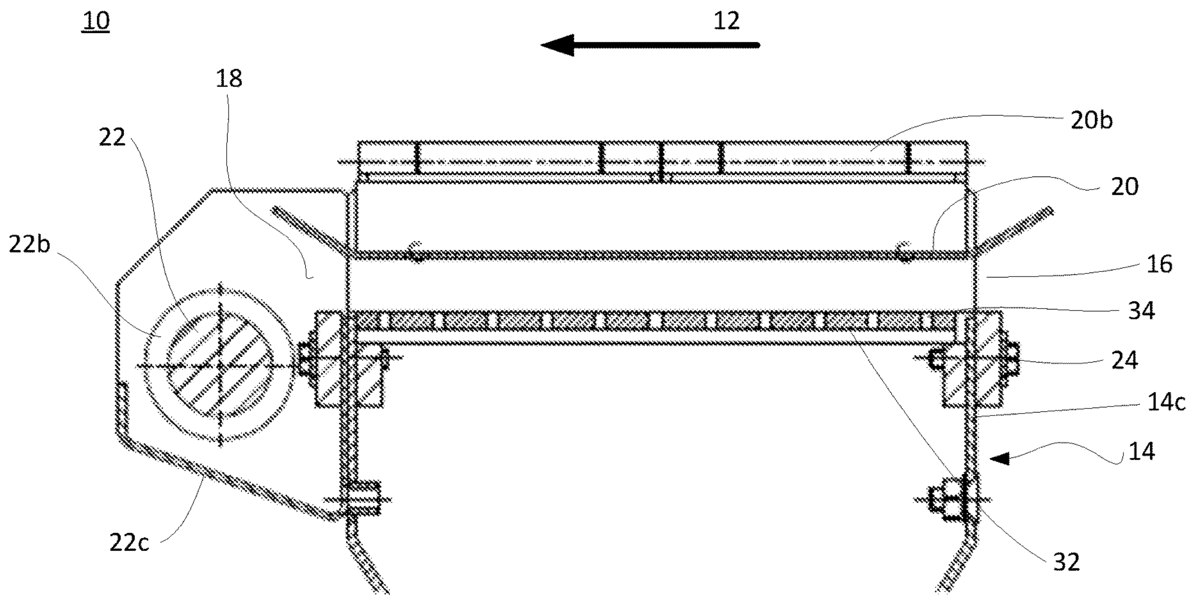
FIG. 5 is a sectional view along section line A-A of the suction device of FIG. 4.

FIG. 5 is a sectional view along section line A-A of the suction device 10 of FIG. 4.

Figure 6:
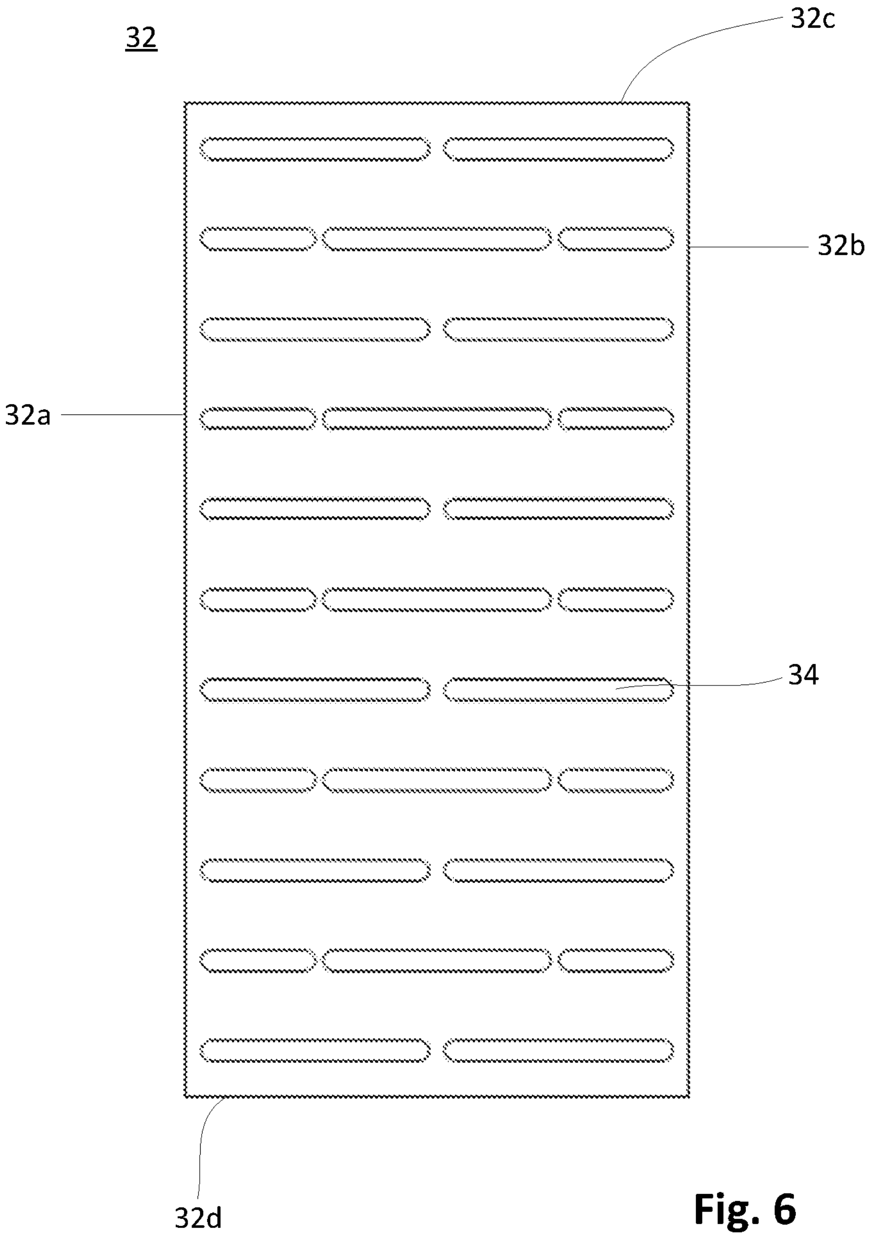
FIG. 6 is a top view of the screening element of the suction device according to the invention.

FIG. 6 is a view of the screening element 32. The slots 34 are each arranged in rows side by side, with each row extending from one long side 32*a* to the other long side 32*b*. The distance between the rows is the same along each of the long sides 32*a*, 32*b*. More precisely, there is an equal distance from the laterally outer ends of the slots 34 to the edge of the long sides 32*a*, 32*b*. Furthermore, the distance from the longitudinally outer ends of the slots 32 to the edge of the short sides 32*c*, 32*d* is the same in each case.

The distance between the rows of slots 34 along the process direction 12 is consistently between 20 mm and 50 mm. Side by side, perpendicular to the process direction 12, the slots 34 are each arranged with a distance of between 8 mm and 30 mm between them.

The screening element 32 is made of corrosion resistant sheet steel, i.e. of stainless steel. A laser is used for making the through apertures 24 into the screening element 32.

A suction unit (not shown) is provided, which conveys the ambient air through the inlet opening 16 into the suction body 14 and through the suction channel 28 out of the suction body 14 into a water separator. The suction unit is arranged outside the suction body 14.

The geometric design of the suction body 14, the area ratios of the opening cross-section of the slots 34 to the surface area of the screening element 32 and the design of the cover 20 increase the effectiveness of the drying performed in the suction device 10 in a simple manner.

LIST OF REFERENCE SIGNS

10 suction device
12 process direction

14 suction body
14*a* front wall
14*b* rear wall
14*c* sidewall
16 first inlet opening
18 second inlet opening
20 cover
20*a* hinge of cover 20
20*b* cover opening of cover 20
20*c* handle of cover 20
22 conveyor element
22*a* axis of rotation of conveyor element 22
22*b* partition wall of conveyor element 22
22*c* housing of conveyor element 22
22*d* cylinder surface
24 fasteners
26 channel sidewall
28 suction channel
32 screening element
32*a* first long side of screening element 32
32*b* second long side of screening element 32
32*c* first short side of screening element 32
32*d* second short side of screening element 32
34 slot
36 connection receptacle
36*a* fastening element of connection receptacle 36

The invention claimed is:

1. A device for drying at least one plastic strand, comprising a housing, consisting of a top side, a bottom side and a several lateral surfaces, the top side having an inlet opening and one of the other surfaces having an outlet opening made therein for the flow of a drying medium therethrough, a screening element with a drying area which has through apertures made therein in a distributed manner and which has a base area of a maximum length and a maximum width, each of the through apertures having an aperture cross-sectional area, and the sum of the aperture cross-sectional areas of all through apertures of the screening element together forming a total aperture cross-sectional area, wherein the screening element is arranged at the top and with its drying area above the inlet opening of the housing, wherein the at least one plastic strand is moved in a process direction on the screening element, wherein the process direction is aligned in a longitudinal direction of the screening element, wherein the length of the drying area is at least 150 mm and a ratio of the total aperture cross-sectional area of the through apertures to the base area of the drying area is in the range of at least one of between 30% and 45%, and between 35% and 40%, of the drying area, and wherein the screening element is formed in several parts and its parts are placed on top of each other in a sandwich-like manner.

2. A device according to claim 1, wherein the length of the drying area is at least 200 mm, and the ratio of the total aperture cross-sectional area of the through apertures to the base area of the drying area remains to be in the range of at least one of between 30% and 45%, and 35% and 40%.

3. A device according to claim 1, wherein the base area of the drying area of the screening element and a base area of the screening element are identical or nearly identical.

4. A device according to 1, wherein the through apertures are slot-shaped and have a greater length than width.

5. A device according to claim 4, wherein the length of the through apertures is perpendicular to the process direction.

6. A device according to claim 4, wherein the length of a through aperture is smaller than the width of the drying area.

7. A device according to claim 4, wherein the width of the through apertures is from 2 mm up to 5 mm.

8. A device according to claim 4, wherein the through apertures are aligned side by side perpendicular to the process direction.

9. A device according to claim 8, wherein a distance between the through apertures arranged next to each other is between 8 mm and 30 mm.

10. A device according to claim 4, wherein several rows of the through apertures are provided, which are aligned parallel to each other in their longitudinal direction.

11. A device according to claim 10, wherein the rows of the through apertures are arranged at a distance from one another of between 0 mm up to 50 mm.

12. A device according to claim 1, wherein the screening element is made of sheet metal.

13. A device according to claim 12, wherein the screening element is formed of corrosion-resistant steel, stainless steel or hardened steel.

14. A device according to claim 1, wherein a laser is used for making the through aperture into the screening element.

15. A device according to claim 1, the base area of the top side of the housing is larger than the base area of the bottom side of the housing.

16. A device according to claim 1, a unit is provided which conveys drying medium, in particular ambient air, into the housing through the inlet opening and out of the housing through the outlet opening.

17. A device according to claim 16, the unit is arranged outside of the housing.

18. A device according to claim 16, the housing is connected to a water separator downstream in the flow direction.

19. A device for drying at least one plastic strand, comprising a housing, consisting of a top side, a bottom side and a several lateral surfaces, the top side having an inlet opening and one of the other surfaces having an outlet opening made therein for the flow of a drying medium therethrough, a screening element with a drying area which has through apertures made therein in a distributed manner and which has a base area of a maximum length and a maximum width, each of the through apertures having an aperture cross-sectional area, and the sum of the aperture cross-sectional areas of all through apertures of the screening element together forming a total aperture cross-sectional area, wherein the screening element is arranged at the top and with its drying area above the inlet opening of the housing, wherein the at least one plastic strand is moved in a process direction on the screening element, wherein the process direction is aligned in a longitudinal direction of the screening element, wherein the length of the drying area is at least 150 mm and a ratio of the total aperture cross-sectional area of the through apertures to the base area of the drying area is in the range of at least one of between 30% and 45%, and between 35% and 40%, of the drying area, and wherein a cover element covering the entire drying area of the screening element is provided on the side of the screening element remote from the inlet opening, the cover element being arranged above the screening element and at a predetermined distance from the screening element.

20. A device according to claim 19, wherein the cover element has its long sides connected to the housing in an airtight manner.

21. A device according to claim 19, wherein a ventilation slot extending perpendicular to the process direction is provided in the cover element centrally with respect to a length of the cover element, so that the drying medium can flow into the drying area at one end of the cover element between the cover element and the screen element, and at the other end of the cover element between the cover element and the screening element and via the ventilation slot.

22. A device according to claim 21, wherein the ventilation slot has an opening cross-section corresponding to 35% to 45% of the base area of the drying area of the screening element, and the cover element has a width of between 4 mm and 5 mm, and a length of between 40 mm and 50 mm.

* * * * *